UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

PROCESS OF PRODUCING AMMONIA AND ALUMINIUM COMPOUNDS.

1,043,798.     Specification of Letters Patent.     Patented Nov. 12, 1912.

No Drawing.     Application filed July 7, 1910. Serial No. 570,863.

*To all whom it may concern:*

Be it known that we, CARL BOSCH, Ph. D., and ALWIN MITTASCH, Ph. D., chemists, subjects, respectively, of the King of Prussia and the King of Saxony, residing at Ludwigshafen-on-the-Rhine, Germany, have invented new and useful Improvements in the Process of Producing Ammonia and Aluminium Compounds, of which the following is a specification.

It is known that aluminium nitrid, upon being treated with water or with alkali or with acid, can be decomposed giving rise to ammonia, but hitherto no process has been described by which ammonia and pure aluminium compounds can be obtained from raw or impure mixtures containing aluminium nitrid such as can be obtained by heating minerals containing aluminium with carbon in a current of nitrogen gas, the impurities present being chiefly nitrids, carbids, and oxids of silicon and titanium. We have found that we can obtain ammonia (under which term we include both free ammonia and also ammonia in the form of its salts) and practically pure aluminium compounds from such raw or impure mixtures containing aluminium nitrid by treating the said mixtures with acid, or with alkali, if care be taken that either limited quantities of the acid, or alkali, are employed, or that the reaction is carried out under mild conditions, that is to say, by suitably choosing the concentration of the ingredients, the temperature, and the time during which the reaction takes place. We prefer to carry out the reaction according to our invention by restricting the quantity of acid, or alkaline, reagent used rather than by lowering the concentration thereof, or diminishing the temperature at which, or the time during which, the reaction is carried out.

If a mineral acid or an organic acid be allowed to act upon the mixture containing aluminium nitrid according to the process of our invention, the quantity thereof can be chosen so that either the nitrogen of the aluminium nitrid is converted into the ammonium salt and also the aluminium is converted into the aluminium salt of the acid employed, or a smaller amount of acid can be employed so that only the nitrogen of the aluminium nitrid is converted into the ammonium salt and goes into solution. In this latter case the reaction which takes place can be represented by the equation:

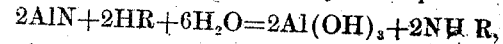
$$2AlN + 2HR + 6H_2O = 2Al(OH)_3 + 2NH_4R,$$

where R represents a suitable acid radical. As a rule, however, the reaction takes place in two steps, because the acid reacts with one part of the aluminium nitrid forming aluminium salt and ammonium salt and then, when no further acid is present, the aluminium salt reacts further with any undecomposed aluminium nitrid, producing aluminium hydroxid and ammonium salt, consequently the process of this invention can also be carried out by subjecting the aluminium nitrid mixture to the action of an aluminium salt so that a process takes place corresponding, for instance, to the equation:—

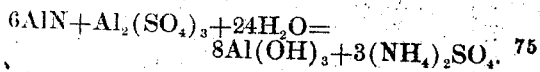
$$6AlN + Al_2(SO_4)_3 + 24H_2O = 8Al(OH)_3 + 3(NH_4)_2SO_4.$$

Other salts, such for instance as iron chlorid, of which the bases are precipitated by ammonia, act in a similar manner and instead of such salts, acid salts, such for instance as bisulfates, can be employed in carrying out the process of our invention. The whole of the acid can be added to the aluminium nitrid at once, or it can be added gradually, and the water necessary can, if desired, be employed in the form of steam. If desired, the mixture containing the nitrid can be treated with water, or steam, before the treatment with the acid takes place, and further an acid, such as carbon dioxid, may be employed which is incapable of forming stable salts with aluminium.

When acting with an alkaline reagent according to our invention on mixtures containing aluminium nitrid, it is advantageous to use from one, to two, molecular proportions of alkali hydroxid for each molecular proportion of aluminium nitrid contained in the raw, or impure, product. In this way saturated aluminate lyes can be produced from which it is easy to prepare pure aluminium hydrate. The quantity or quality of the alkaline reagent (which may include an oxid, or hydroxid, or a suitable salt) can, however, be chosen, if desired, so that the aluminium nitrid compound is decomposed, but the aluminium hydroxid produced is not, or is not completely, brought into solution. The basic compound can be added all at once before the reaction takes place, or it can be added gradually during the reaction. If desired, the nitrid can be treated with water or steam and subsequently with the definite quantity of alkali. The aluminate solution produced during the reaction can generally be filtered away and any undissolved aluminium compound can be brought into solution either by means of an acid, or an alkali, and in this way be separated from the original impurities contained mixed with the aluminium nitrid. The raw product obtained according to our invention can also be used for the production of aluminium double salts, in which case it is only necessary to add a suitable acid or acid salt, and any alkali which may be required.

When carrying out the process according to our invention either by means of acid or alkali, it is often advantageous to add a neutral salt by which especially in the case where small quantities of alkali are employed the evolution of ammonia is increased. This method of procedure is particularly advantageous when it is desired to prepare aluminium double salts, in which case of course the salt chosen is that of an acid in accordance with the double salt required.

If desired, the mixture containing aluminium nitrid can be purified in any suitable manner before it is reacted upon with acid or alkali according to the process of this invention.

The following examples will serve to illustrate further the nature of our invention, which, however, is not confined to these examples. The parts are by weight.

Example 1: Heat together, for a few hours, at about one hundred degrees centigrade, three hundred and sixty parts of a twenty-two per cent. sulfuric acid and fifty parts of silicon-aluminium nitrid containing eighteen per cent. of nitrogen attached to the silicon and eight per cent. attached to the aluminium. Upon filtration, a solution containing ammonium sulfate and aluminium sulfate is obtained and this can be worked up in any desired manner. If desired, the silicon-aluminium nitrid can be purified before being used, by treating it with cold dilute sulfuric acid and filtering it.

Example 2: Digest together two hundred and ten parts of forty-eight per cent. sulfuric acid and one hundred parts of raw aluminium nitrid which is mixed with silicon compounds and contains twenty-eight per cent. of combined nitrogen. After a short time a solid mass is obtained containing aluminium hydrate and ammonium sulfate. The ammonium sulfate can be extracted by means of water and the aluminium hydrate remains behind and can be converted into a salt by treatment with the corresponding acid.

Example 3: Heat together in an autoclave, while stirring, at a temperature of from one hundred and twenty, to one hundred and forty, degrees centigrade, two hundred and fifty parts of twenty per cent. acetic acid and fifty parts of crude aluminium nitrid containing twenty-four per cent. of combined nitrogen. After a few hours filter off and wash the residue. The solution contains ammonium acetate which can be separated by evaporation.

Example 4: Heat sixty parts of aluminium nitrid containing thirty per cent. of nitrogen combined with aluminium and two per cent. combined with silicon (the aluminium nitrid should preferably have been purified by treating it with air at a red heat) and two hundred and forty parts of water at from ninety, to one hundred, degrees centigrade in a vessel provided with a stirring apparatus and with a reflux condenser. At the same time pass nitric acid gas into the vessel in such a manner that the solution continually remains practically neutral. As soon as the theoretical amount of nitric acid has been used, or as soon as a test shows that all the aluminium nitrid has been split up, subject the mass to filtration, whereby a concentrated solution of aluminium nitrate is obtained, while the aluminium hydroxid contained in the residue can be obtained therefrom by means of the requisite quantity of acid or alkali.

Example 5: Heat together, in an autoclave, for one hour at one hundred and ten degrees centigrade, eighty parts of aluminium-silicon-titanium nitrid (containing sixteen per cent. of nitrogen combined with the aluminium) prepared by heating bauxite, which contains titanium and silicon, with carbon in the presence of nitrogen gas, and three hundred and sixty parts of eighteen per cent. caustic soda solution. Then allow the ammonia to escape, filter off the solution of aluminate and work it up into aluminium hydrate.

Example 6: Heat together, in an autoclave, for three hours, at from one hundred and twenty, to one hundred and thirty, degrees centigrade, one hundred parts of raw aluminium nitrid containing twenty-eight per cent. of combined nitrogen and considerable quantities of iron, coal, and silicon compounds, one hundred and twenty parts of caustic soda and six hundred parts of water. The ammonia can be allowed to escape periodically or continuously. Toward the close of the operation, place the vessel under reduced pressure so that the last portions of ammonia are removed, then filter and treat the filtrate with a small quantity of crystallized aluminium hydrate, and then shake, or stir, whereupon a very pure aluminium hydroxid is obtained. In this example, if desired, the reaction can be carried out at a temperature of one hundred degrees centigrade, or less, and the last portions of ammonia can be driven out by passing a current of indifferent gas through the solution.

Example 7: Boil together twenty-two parts of potassium carbonate, three hundred and fifty parts of water and fifty parts of a mixture containing seventy-six per cent. of aluminium nitrid and nine per cent. of silicon nitrid. When the first evolution of ammonia begins to decrease, add gradually nine parts of caustic potash and heat until all the aluminium nitrid is decomposed and pass a current of air through the solution in order to drive off any dissolved ammonia. The solution contains potassium aluminate and any free aluminium hydroxid can be filtered off and used in any suitable manner. If desired, however, the whole reaction mixture can be treated with three hundred and fifty parts of forty-eight per cent. sulfuric acid and forty-two parts of potassium sulfate and the hot solution can be filtered, whereupon, on cooling, potash alum is obtained in crystals.

Example 8: Heat together, for two hours, in an autoclave, at one hundred and forty degrees centigrade, ten parts of aluminium nitrid mixed with silicates, silicon carbid and unaltered alumina, and containing twenty-seven per cent. of combined nitrogen, with nine parts of quicklime, and fifty parts of water, and then drive off the ammonia from the reaction mass. Alkali aluminate can be obtained by treatment with soda, or, if the required quantity of sulfuric acid be added, aluminium sulfate can be obtained.

Example 9: Mix aluminium-titanium nitrid with the quantity of caustic soda necessary for the formation of sodium aluminate and heat the mass in a tube for four hours at from one hundred and fifty, to two hundred, degrees centigrade, while passing steam through the tube. Sodium aluminate can be separated from the undecomposed titanium nitrid by extracting it with water.

Example 10: Boil together one hundred parts of crude aluminium nitrid, containing silicon nitrid, and four hundred and thirty parts of an aqueous solution containing two parts of caustic soda and forty parts of common salt. The nitrogen of the aluminium nitrid is very rapidly evolved in the form of ammonia.

Now what we claim is:—

1. The process of producing ammonia and aluminium compounds from crude mixtures containing aluminium nitrid by heating such mixtures with a decomposing agent under such mild conditions that the aluminium nitrid is converted into an ammoniacal product and an alumina product, but so that the other ingredients of the mixture remain practically unaltered.

2. The process of producing ammonia and aluminium compounds from crude mixtures containing aluminium nitrid by heating such mixtures with such an amount of a compound with an alkaline reaction that the nitrogen is converted into ammonia and the aluminium into an aluminium compound containing oxygen but so that the other ingredients of the mixture remain practically unaltered.

3. The process of producing ammonia and aluminium compounds from crude mixtures containing aluminium nitrid by heating such mixtures with such an amount of a compound with an alkaline reaction that the nitrogen is converted into ammonia and the aluminium into aluminate but so that the other ingredients of the mixture remain practically unaltered.

4. The process of producing ammonia and aluminium compounds from crude mixtures containing aluminium nitrid by heating such mixtures with such an amount of caustic soda that the nitrogen is converted into ammonia and the aluminium into an aluminium compound containing oxygen but so that the other ingredients of the mixture remain practically unaltered.

5. The process of producing ammonia and aluminium compounds from crude mixtures containing aluminium nitrid by heating such mixtures with such an amount of caustic soda that the nitrogen is converted into ammonia and the aluminium into sodium aluminate but so that the other ingredients of the mixture remain practically unaltered.

6. The process of producing ammonia and aluminium compounds from crude mixtures containing aluminium nitrid by heating such mixtures with from one to two molecular proportions of caustic soda for each molecular proportion of aluminium nitrid but so that the other ingredients of the mixture remain practically unaltered.

7. The process of producing ammonia and aluminium compounds from crude mixtures containing aluminium nitrid by heating such mixtures with from one to two molecular proportions of caustic soda, for each molecular proportion of aluminium nitrid while employing pressure but so that the other ingredients of the mixture remain practically unaltered.

8. The process of producing ammonia and aluminium compounds from crude mixtures containing aluminium nitrid by heating such mixtures with from one to two molecular proportions of caustic soda for each molecular proportion of aluminium nitrid, while employing a pressure of from one to five atmospheres but so that the other ingredients of the mixture remain practically unaltered.

In testimony whereof we have hereunto set our hands in the presence of two subscribing witnesses.

CARL BOSCH.
ALWIN MITTASCH.

Witnesses:
J. ALEC. LLOYD,
ERNEST L. IVES.